Sept. 22, 1953          R. E. KINKEAD          2,653,212

PROCESS OF MAKING COMPOSITE METAL

Filed Aug. 8, 1951          5 Sheets-Sheet 1

INVENTOR.
ROBERT E. KINKEAD
BY Richey & Watts
ATTORNEYS

Sept. 22, 1953 R. E. KINKEAD 2,653,212
PROCESS OF MAKING COMPOSITE METAL
Filed Aug. 8, 1951 5 Sheets-Sheet 3

INVENTOR.
ROBERT E. KINKEAD
BY Rickey & Watts
ATTORNEYS

Sept. 22, 1953 R. E. KINKEAD 2,653,212
PROCESS OF MAKING COMPOSITE METAL
Filed Aug. 8, 1951 5 Sheets-Sheet 4
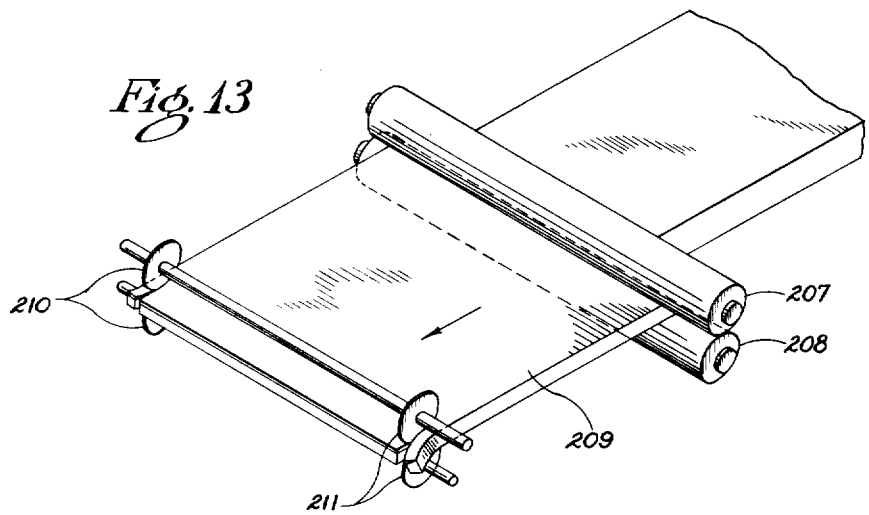
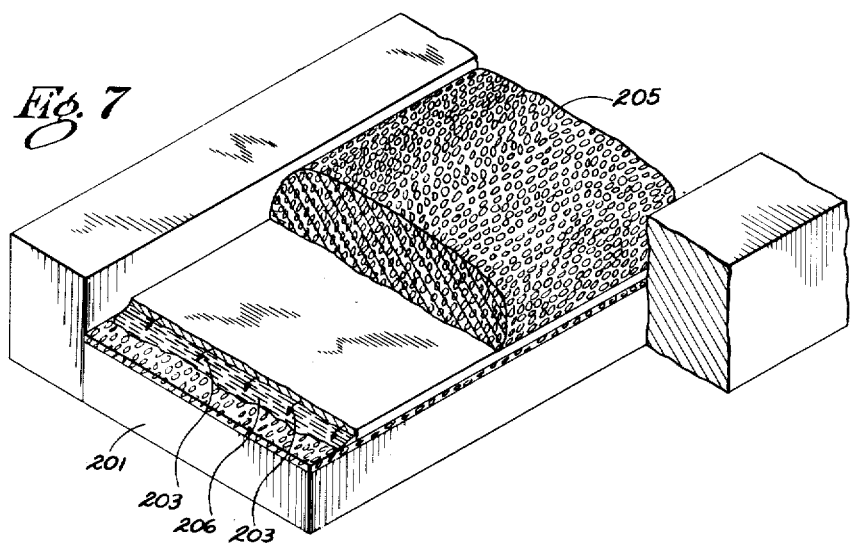
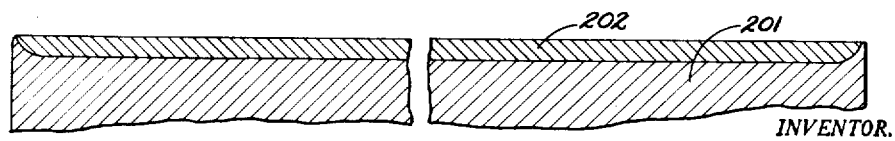
INVENTOR.
ROBERT E. KINKEAD
BY
Richey & Watts
ATTORNEYS Sept. 22, 1953  R. E. KINKEAD  2,653,212
PROCESS OF MAKING COMPOSITE METAL
Filed Aug. 8, 1951  5 Sheets-Sheet 5

INVENTOR.
ROBERT E. KINKEAD
BY Richey & Watts
ATTORNEYS

Patented Sept. 22, 1953

2,653,212

UNITED STATES PATENT OFFICE 2,653,212

PROCESS OF MAKING COMPOSITE METAL

Robert E. Kinkead, Shaker Heights, Ohio, assignor to The Cleveland Trust Company, Cleveland, Ohio, a corporation of Ohio, as trustee Application August 8, 1951, Serial No. 240,924

20 Claims. (Cl. 219—10)

My invention relates to metal joining and relates particularly to manufacture of composite metal.

An object of my invention is to provide improved methods and apparatus for welding, and especially for applying a layer of metal to another by welding. Another object is to provide arrangements for manufacturing composite metal by utilizing self consuming welding electrodes.

It is a further object of my invention to provide a process for applying a layer of one material such as stainless steel to another material such as low carbon steel by utilizing a stainless steel electrode that is self consuming and wherein the electrode is insulated with respect to the low carbon steel except at the arc by a non-gaseous slag forming material such as prefused sand.

It is a further object of my invention to provide a process according to the preceding object wherein the arc is shielded with respect to the atmosphere by the same slag forming material.

Other objects are to protect the arc and to provide for ionization thereof in arc welding. A more specific object is to supply slag forming and ionizing materials to a welding arc. A further object is to accomplish this continuously as the electrode is consumed.

Still another object is to supply welding current to a continuously consuming electrode without heating the length of the electrode and without excessive dissipation of energy therein.

It is a further object of my invention to provide a process according to the preceding object utilizing one or more flat electrodes. It is also an object to provide a process according to the preceding object wherein the composite material is rolled and trimmed to provide a sheet including a surface layer of electrode metal.

Another object is to distribute the electric current in predetermined proportion to a plurality of simultaneously operating welding electrodes, and to control the relative current supplied to the electrodes for balancing heating and cooling effects between the center and edges of a slab having a plurality of self consuming welding electrodes laid thereon.

Still another object is to provide arrangements for applying a metallic coating of uniform thickness, mechanical properties, and composition, with or without an intermediate layer of alloying elements, and which is free from blow holes, contamination with the air, irregularities in mechanical structure or hardness, weaknesses or other defects.

Other and further objects, features and advantages of the invention will become apparent as the description proceeds.

In carrying out the invention in accordance with a preferred embodiment thereof, composite metal is produced by depositing one or more layers of weld metal upon a slab of base metal. This is accomplished by arranging a row of self-consuming welding electrodes side-by-side in parallel upon the surface of a slab of metal. The electrodes are in rod form and may be coated with insulating material, but preferably they are bare and a layer of insulating material is placed between the electrodes and the slab surface. For protecting the arcs produced between the electrodes and the slab, the electrodes are covered with slag forming material in granular or gravel form. Either the insulating material or the slag forming material contains ionizing substances for maintaining the arc.

Electrical connections are made to each of the electrodes and to the slab for supplying welding current and sustaining the arc. As the electrode is consumed, the metal of which it is composed is melted and deposits upon the surface of the slab to form a metallic coating.

A better understanding of the invention will be afforded by the following detailed description considered in conjunction with the accompanying drawings, and the scope of the invention will be set forth in the claims appended hereto.

In the drawings:

Fig. 7 is a perspective showing with parts broken away of a form of my invention utilizing a single flat electrode;

Fig. 12 is a sectional view with parts broken away showing rolled composite sheet with the electrode forming the top surface layer of the sheet; and Fig. 13 is a perspective view showing the rolling and trimming operations carried out to complete a composite metal sheet.

Like reference characters are utilized throughout the drawing to designate like parts.

Reference is made to my co-pending applications Serial No. 579,255, filed February 22, 1945, and Serial No. 48,182, filed September 8, 1948, disclosing and claiming certain apparatus and methods for welding by the use of self-consuming welding electrodes and the manufacture of composite metal slabs and sheets. The present application is a continuation-in-part of said co-pending applications. The said application Serial No. 579,255, now abandoned, was in part a continuation of my application, Serial No. 406,695, filed August 13, 1941, now Patent No. 2,402,165. The apparatus disclosed herein and in said parent application is claimed in my application Serial No. 48,182, filed September 8, 1948, now Patent No. 2,631,214.

Figure 1:
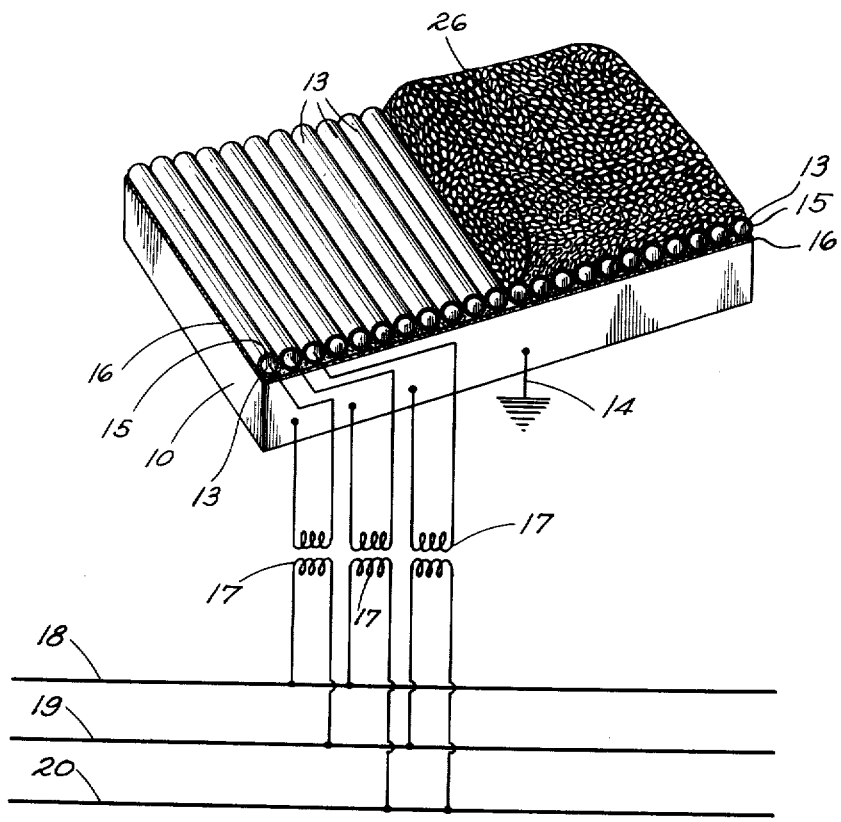
Fig. 1 is a perspective view, partially schematic, of an arrangement for producing composite metal, illustrating the principle of operation of an embodiment of my invention.

In Fig. 1 of my present application I have illustrated an arrangement for the application of the present invention to the making of composite metal. It is frequently desired to weld a layer of metal of one composition to the surface of metal of a different composition. For example, stainless steel is deposited by welding on a slab of ordinary low carbon steel prior to rolling so that after the slab has been rolled the resultant plate, sheet, or strip consists of a body of low carbon steel with a stainless steel surface.

This may be accomplished with the present invention by laying a series of electrodes 13 along the surface of a slab or the like 10. Preferably in the arrangement of Fig. 1, the electrodes are provided with coatings 15 for forming a gaseous shield about the arcs although gaseous shielding material may be supplied to the arcs in other ways. The series of electrodes are then covered with gravel 26 for protecting the arcs by a slag shield and welded simultaneously depositing a layer of the electrode metal on the surface of the slab 10. The arcs are started at the ends of the electrodes 13 by wads of steel wool, filings or the like interposed between bared ends of the electrodes and the slab 10 or by carbon pencils. Each arc then progresses along the electrode as the electrode is consumed.

It is also feasible, in order to reduce the expense of the electrodes, to employ electrodes 13 of relatively cheap material and add the alloying elements separately. For example, a layer 16 of ferrochrome and metallic nickel particles or the like may be spread upon the surface of the slab 10 before arranging the electrodes 13 thereon. The chromium, nickel or other alloying ingredients may be spread uniformly along the surface and ordinary steel electrodes 13 of a diameter to supply the desired amount of steel arranged thereon. The action of the arcs fuses the surface of the parent metal 10, the layer of alloying ingredients 16, and the metal of the electrodes themselves and allows the same to mix and alloy to form a uniform alloy layer of the desired composition and thickness.

In this application of the process it is preferred to connect one side of a welding current circuit to each electrode 13 with the other side connected to the slab 10. This may be accomplished by providing a separate welding generator for each electrode, or, when it is desired to use alternating current, a transformer may be provided for each electrode. As shown in Fig. 1, transformers 17 may be connected to the three circuits of a three phase system supplied by line wires 18, 19 and 20, so that each circuit supplies every third electrode through a transformer. In this way the load is balanced on the supply lines, and at the same time the heat developed by the arcs is balanced through each group of three electrodes, providing a steadier and more uniform heating of the slab 10 and the layer of alloying material 16.

I have found that ordinary silica gravel which has been washed, screened and dried works very satisfactorily for producing a slag shield. Such material consists largely of $SiO_2$ which fuses in the heat of the arc to form glass, the small quantities of iron and calcium compounds normally being present not interfering in any way with the action. Similarly broken glass that has been washed, screened and dried operates with complete satisfaction. Alternatively, I have found that an ordinary calcium carbonate flux, composed of crushed and screened marble or limestone, may be used. This material likewise must be in particles of such size as to permit the escape of the gases at the welding crater without being displaced, and to fuse behind the weld into a coating of slag. The gravel or broken glass is preferred, however, because it gives off no additional gas in fusing and forms a slag which is more readily removed from the weld after it has cooled.

As the arc progresses along the electrode the large volume of gases formed by the gaseous shielding material in the coating 15 escapes through the interstices in the gravel 26 at and immediately in advance of the arc. Gases having a reducing nature are ordinarily observed burning above the gravel. Immediately behind the arc, the gravel fuses and solidifies in the general form of a cellular glass arch extending around, and spaced from, the completed weld. Apparently the action of the gravel is primarily a mechanical action compelling the arc and the molten metal from the electrode to extend downwardly substantially at right angles to the axis of the electrode instead of extending axially of the electrode in accordance with the natural tendency which exists in the absence of the gravel. This action seems to be due, at least in part, to the fact that the gases from the gaseous shield are restrained by the fusing of the gravel from shooting out axially from the electrode, and instead are compelled to escape laterally or upwardly through the fused or unfused gravel immediately around the arc. There may, in addition, be some fluxing of the weld metal by the fused gravel or the like immediately behind the arc, but it appears that such fluxing action is unnecessary since the arc is shielded and fluxed by the coating 15.

The desired relation between the arc length, the rate of movement of the arc along the weld, and the rate at which electrode metal is added to the weld is obtained automatically with this process, eliminating the necessity of the nice correlation of these factors characteristic of hand and machine welding processes heretofore used. The thickness of the coating 15 accurately and uniformly fixes the arc length, and the progression of the arc and the amount of electrode metal deposited are determined by the size of the electrode and the current density. Since each inch of weld is made by an inch of electrode, an electrode is selected having a cross-sectional area equal to the desired cross-sectional area of added metal in the weld, allowance being made as usual for the elements lost in the arc. The current densities may correspond to the standard ranges utilized in hand welding, although higher values may be used when desired because disruption of the gaseous shield is prevented by the gravel.

Where the electrical connections are such as to permit a passage of current directly from one electrode to another, the electrodes are preferably spaced apart a sufficient distance to prevent such arcing across so that each arc passes between its electrode and the slab itself. The electrodes are kept sufficiently close to each other, however, so that the pools of the arcs run together so that the arcs travel at the same speed and a uniform penetration and coating composition is obtained across the entire surface of the slab.

The cooling of the weld metal is retarded by the protective arch formed over the weld by the molten gravel or glass, resulting in a substantial decrease in hardness where alloy steel is being welded. When desired, an excess of gravel may be employed to partially insulate the molten layer of gravel from the atmosphere and further retard the cooling. An excess of gravel may also be used to conceal the arc from view so as to "blackout" the welding operation from enemy observation.

Figure 3:
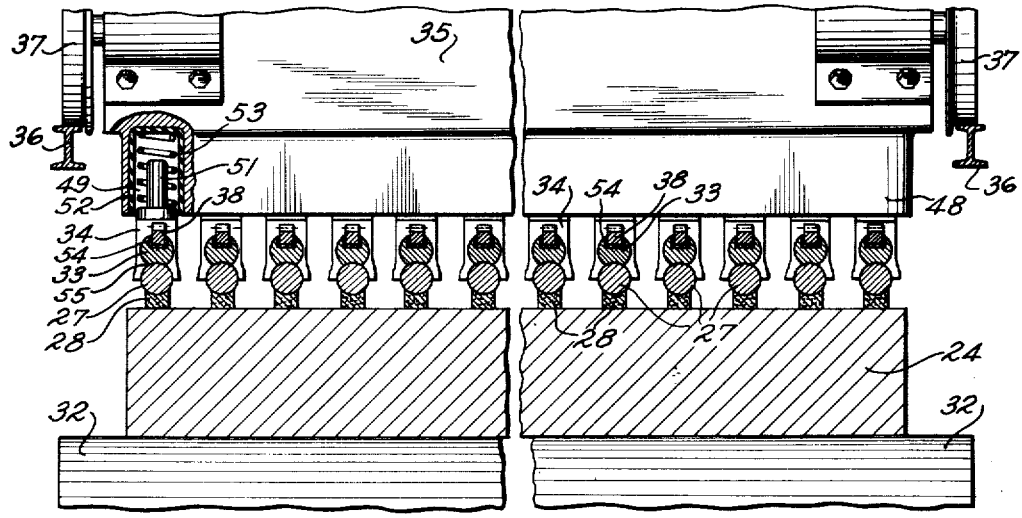
Fig. 3 is a cross-sectional view of the portion of the apparatus of Fig. 2, represented as cut by a broken plane 3—3.

Fig. 3 illustrates an arrangement which has been found to be satisfactory in carrying out this process with the use of bare, instead of coated, electrodes. In this arrangement a bare electrode 27 is laid upon the slab with a strip of material 28, composed of the material ordinarily used for the coating 15 on the covered electrodes, interposed between the electrodes and a slab 24. The strip 28 is made of a uniform thickness to space the electrode the desired distance from the slab 24, and of sufficient width to prevent the electrode from contacting the slab and shorting the welding circuit. The strip of material 28, like the conventional coating 15 for the weldrods, may consist of paper, wood flour, or other cellulosic material impregnated with sodium silicate, calcium oxide, and magnesium oxide, or other slag forming and ionizing elements, it being only necessary that the strip 28, like the coating 15, produce sufficient quantities of reducing and ionizing gases to shield and sustain the arc. If desired the silicates or other elements usually present in the electrode coatings which produce a fluxing slag may be omitted from the coating 15 or the strip 28, since the arc is completely shielded by the gas and the weld metal is protected as it cools by the slag coating provided by fusing of the gravel 29.

The secondary windings of the transformers 17 are preferably Y connected, having what amounts to a grounded neutral connection since the base plate or slab 10 is in effect grounded as represented schematically by a ground connection 14. However, as shown, each of the secondary windings is preferably connected at one end directly to the slab 10 in order that sufficient current may efficiently be supplied to the welding electrodes.

Figure 2:
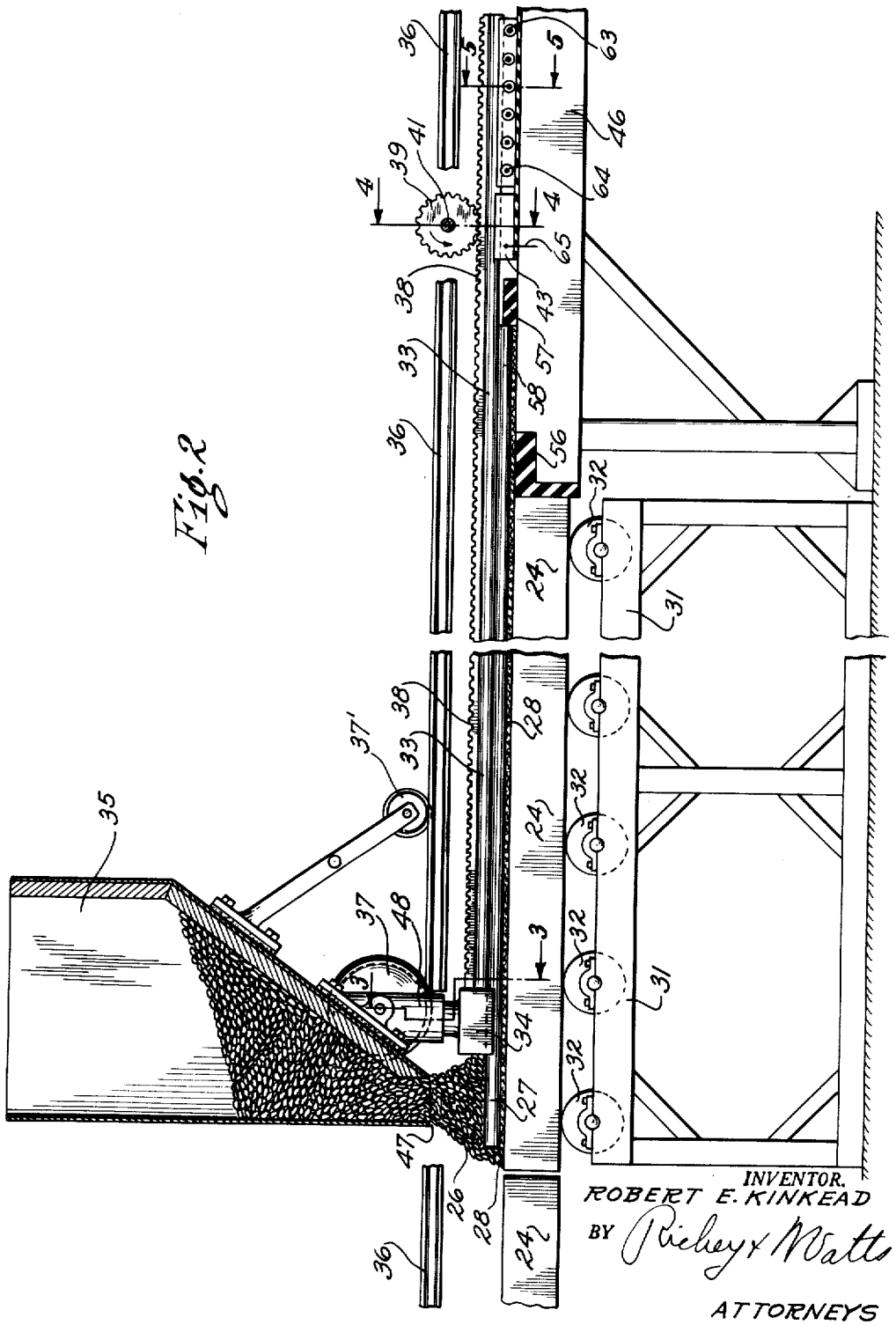
Fig. 2 is a side elevation, partially in section, illustrating composite metal manufacturing apparatus constituting an embodiment of my invention.

In the arrangement of Fig. 1 the slab 10 is relatively narrow and a large number of relatively short electrodes 13 are laid side-by-side across the plate or slab 10. However, my invention is not limited to the specific arrangement illustrated in Fig. 1. For example, as illustrated in Figs. 2 and 3, welding electrodes, in this case represented by bare electrodes 27, may also be laid length-wise of a relatively long slab 24. In this manner, fewer electrodes need be handled, and the process and operations may more readily be carried out mechanically.

In the arrangement of Fig. 2 the slag-forming gravel is fed to the slab 24 as the row of welding arcs progresses from one end of the slab to the other. In order to avoid dissipation of energy in the portion of the electrode away from the arc, and to avoid premature destruction of the strip 28 by heating any part of the electrode except that adjacent the arc, means are provided for progressively moving the point of application of electrical current to the electrode as the arc progresses.

The apparatus of Figs. 2 and 3 comprises a suitable platform 31 carrying a plurality of rotatable rollers or wheels 32 for supporting a slab 24 which is to be coated with weld metal to form a composite metal. A plurality of conductors 33, each terminating in a contact shoe 34, is provided for supplying electrical current to the electrodes 27, and a movable hopper 35 is provided for supplying the gravel 26 to the arcing electrodes and covering the arcs.

Figure 6:
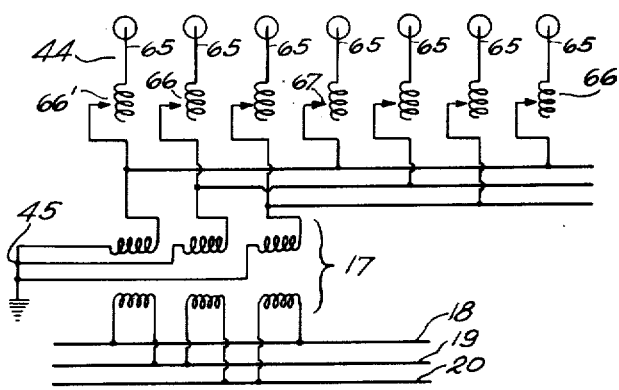
Fig. 6 is a circuit diagram illustrating electrical connections for the apparatus of the Figs. 2 to 5.

For movably supporting the hopper 35, suitable means are provided such as a pair of rails 36 mounted on either side of the platform 31, a pair of main supporting wheels 37 carried by the hopper 35, and a pair of guide wheels or balance wheels 37', also carried by the hopper 35, the wheels 37 and 37' being adapted to roll upon the rails 36. For moving the hopper 35 and withdrawing the contact shoes 34 as the welding arc progresses, a series of racks 38 is provided, each mechanically secured to one of the contact rods or conductors 33, and each having a driving pinion 39 enmeshed therewith. The pinions 39 are keyed to a common driveshaft 41 powered by suitable means such as electric motor (not shown). For separately feeding electrical current to each of the conductor rods 33, separate insulated stationary contacts or shoes 43 are provided, each of which, in turn, is connected to one of the branch circuits 44 of the secondary side of the supply transformers 17 represented in Fig. 6. It is to be understood that the ground or neutral connection 45 of the secondary windings of the transformers is in practice directly connected to the slab 24 through high conductivity contacting means (not shown).

A table 46 is provided for supporting the contacts 43 and other associate apparatus including the conductors 33 and the racks 38.

The hopper 35 is provided with an elongated spout 47 extending transversely across the slab 24 for delivering the gravel or slag forming material 26 to the slab 24. As illustrated more clearly in Fig. 3, the hopper 35 has formed therein or secured thereto a housing or casing 48 having a plurality of chambers 49 therein for positioning the contact shoes 34. Each such contact shoe 34 has an upwardly extending locating rod 51 secured to the shoe 34 and has a suitable insulating mechanical connection such as a block of insulating material 52. For resiliently biasing the contact shoe 34 downward to give the requisite degree of contact pressure between the electrode 27 and the shoe 34, suitable means such as compression springs 53 are provided.

Each of the contact shoes 34 is electrically connected to the end of the corresponding conductor rod 33, as well as being mechanically connected thereto. Each of the racks 38 is also mechanically connected to the corresponding conductor rod 33 and is insulated therefrom. For example, as illustrated, the upper surface of each rod 33 may be grooved to receive the rack 38 and a layer of suitable insulating sheet material 54 is interposed between the rack and the conductor rod. Suitable mechanical connecting means such as insulated screws or the like (not shown) are provided for effecting a rigid mechanical connection between the rack 38 and the conductor rod 33.

The hopper 35 is mechanically connected to the contact shoes 34, although insulated therefrom for the purpose of causing the hopper 35 to be rolled along the rail 36 as the rack 38 is retracted to retract the contact shoes 34. This mechanical connection between the contact shoe 34 and the hopper 35 is effected by the fitting of the insulated rod 51 of each shoe 34 within the rack housing 48. Preferably the lower side of each conductor rod 33 is cut away to form a cylindrical segmental slot 55 fitting the top surface of the electrode 27.

For locating the slab 24 and holding it in a fixed position as the welding operation is being performed thereon, an end stop is provided for the slab 24. Preferably the table 46 is arranged to serve as the end stop. Insulation of the slab 24 from the table 46 is preferably effected by providing a suitable insulating insert 56 for the end of the table composed of slate, asbestos board, or other refractory insulating material. For similarly locating the electrodes 27 and preventing movement thereof during the welding operation, an end stop 57 is secured to the surface of the table 46. The stop 57 may take the form of a strip of insulating material such as a phenolic condensation product or fabric impregnated with plastic insulating material extending transversely across the table 46. Preferably, the ends 58 of the electrodes 27 overhang the slab 24 sufficiently to permit the contact shoes 34 to be moved beyond the ends of the slab 24 in order that the arcs may continue from one end of the slab to the other, in order that the entire top surface of the slab may be coated.

Suitable means are provided for securing the contact shoes 43 in a fixed position on the table 46 and insulating them from the table 46. For example, they may be laid in troughs composed of insulating material 59 and secured by means of terminal studs 61 extending downwardly through suitable openings in the table 46, and insulated by means of insulating bushings 62.

Figures 4, 5:
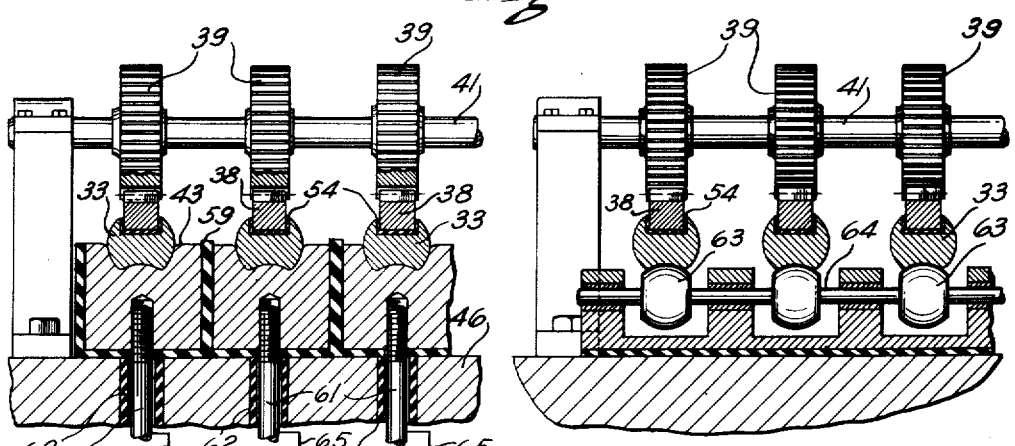
Fig. 4 is a cross-sectional view of the portion of the apparatus of Fig. 2, represented as cut by a plane 4—4.
Fig. 5 is a corresponding fragmentary cross-sectional view as cut by a plane 5—5 indicated in Fig. 2.

For supporting the racks 38 and the conductor rods 33 as they are retracted along the slab 24, a series of suitable rollers 63 or the like shown in Fig. 5 may be provided, each consisting of a portion of a spherical roll, being composed of suitable insulating material and being mounted upon a rotatably mounted shaft 64.

In order that the current in each electrode 27 may be maintained constant without interaction of the current in one arc upon that of another, each terminal stud 61 preferably has a separate electrical connection 65 thereto. A single set of transformers 17 may be utilized for supplying the conductors or connections 65, but preferably branch circuits are formed by means of impedance isolation of each connection 65. Thus suitable impedance devices such as choke-coils 66 may be interposed in series with each connection 65. For equally loading the phases of the transformers 17 successive choke-coils 66 are connected to different transformers, each third choke-coil being connected to the same transformer output line.

For enabling individual adjustment of current in each arc, the choke-coils 66 are preferably adjustable, for example having adjustable taps 67. It is to be understood that for simplicity in the drawing some of the connections and choke-coils have been omitted in Fig. 6. Likewise in Fig. 3 the middle portion of the apparatus is broken away.

My invention is not limited to the use of any particular dimensions, however, I have found that when a 4-inch slab approximately 30 inches wide by 18 feet long is to be coated, successful results may be obtained by utilizing 15 electrodes laid side-by-side and connected in 15 different branch circuits through 15 choke-coils. Owing to the fact that the electrodes at the two sides or edges of the slab 24 are subjected to a greater cooling effect, and do not receive heating from both sides, I prefer to provide means for supplying additional heat to the side electrodes. For example, this may be accomplished by supplying additional current by setting the choke-coils feeding the side electrodes one of which is represented by choke-coil 66' so as to have lower impedance than the remaining choke-coils 66.

In coating a four-inch slab which is 30 inches wide and 18 feet long, satisfactory results may be obtained by utilizing 15 one-inch electrodes resting upon insulating strips $\frac{1}{16}$ of an inch thick. In such an arrangement with a current density of 3500 amps. per square inch, a burning speed of from 12 inches to 24 inches per minute of the electrode is obtained. The electrode has a composition such that when alloyed with the slab, it will give a surface coating of the desired composition, taking into consideration that the dilution may be from 10% to 50% of the volume of the electrode metal, depending upon the elements employed and the conditions of operation.

Where the insulating strip or burning material consists of cellulosic material, it may contain calcium fluoride or sodium fluoride as an ionizer for sustaining the arc. However, the invention is not limited to providing the ionizer in the electrode insulating material. This ionizing substance may also be provided in a prefused slag-forming gravel or granular flux which may consist primarily of natural clay, largely silicon dioxide together with oxides of aluminum, iron and calcium with metallic manganese and iron to which the ionizing substance has been added. The clay is fused and then ground to powder.

In the course of the operation of the apparatus of Figs. 2 and 3, the hopper 35 and the conductor rods 33 are moved to the right so that after a slab has been completely coated, the hopper 35 is entirely above the table 46. The completed slab is removed by sliding it to the left, and a fresh slab to be coated is moved into place by inserting it from the left. Since the hopper 35 is still in the position completely to the right above the table 46, the top surface of the fresh slab 24 to be coated is exposed. The rows of strips 28 of insulating burning material are then laid upon the slab 24, and the electrodes 27 are laid upon the strips 28 with the end of each electrode resting against the insulating stop 57, and inserted under the contact shoe 34. If there is any gravel remaining in the hopper 35, the spout 47 is closed by shutting a lower door (omitted from the drawing for the sake of simplicity). A temporary stop is clamped at the left-hand end of the slab against the left ends of the electrodes 27 and the gear wheels 39 are rotated in the reverse direction to move the hopper 35 and the contact rods 33 toward the left-hand end of the slab 24. When the hopper 35 has reached a position about as far to the left as that shown in Fig. 2, the rotation of the gears 39 is stopped, the clamps are moved from the left-hand end of the rods 33, the hopper 35 is recharged with gravel and the spout 47 is opened.

For enabling arcs to be started lengths of wire may be wrapped around the ends of the electrodes 27 and laid in contact with the slab 24.

After sufficient gravel has been discharged to form the pile of slag-forming material 26 at the left-hand end of the slab 24 as shown in Fig. 2, current is connected to the transformers 17 so as to start the arcs and thereupon power is applied to the drive shaft 41 for causing the hopper 35 to move to the right, and for causing the conductor rods 33 to be withdrawn gradually at approximately the same speed as the arc progresses along the slab 24. Additional slag-forming material is continuously discharged from the spout 37 of the hopper 35 as it moves to the right so that the arc is constantly protected against spattering and kept stable in position.

Since the contact shoes 34 always remain relatively close to the arc, the resistance drop in the electrode 27 is relatively small, and only the end portion of the electrode becomes heated so that insulating burning material 28 is not destroyed until the arc approaches it. The portion of the electrode 27 between the contact shoe 34 and the terminal shoe 43 remains cool owing to the fact that no current flows in this portion of the electrode. The presence of the slag around the arc and the ionizing gases for maintaining the arc serve to protect the molten material from contamination from the atmosphere, and prevent the spattering or blowing of the arcs so as to form blow-holes, and thus, also, accomplish freedom from irregularity and weakness. Owing to the uniformity with which the operation proceeds, a uniform coating is produced which is uniform not only as to thickness and mechanical properties but also as to degree of alloying and chemical composition.

As the rolling mechanism approaches the extreme right-hand position, the arcs reach the right-hand end of the slab 24 and are thereupon confronted by the insulating block 36 which breaks the electrical circuits between the electrodes 27 and the slab 24 so that the arcs are extinguished.

The short lengths of electrode 27 remaining under the contact shoes 34 are then removed, a completed composite metal slab 24 is rolled away to the left, and the apparatus is in condition for the coating of a fresh slab by repetition of the operations already described.

In carrying out the process with this apparatus, as in the embodiment illustrated in Fig. 1, all of the arcs are started simultaneously and progress together across the slab. The electrodes are kept sufficiently close to each other so that the pools of the arcs join forming in effect a single arc welding pool in the form of a strip across the slab and moving uniformly throughout the length of the slab. The electrodes are preferably spaced, however, a sufficient amount to prevent arcing between the electrodes in the event the electrical connections are such as to permit such arcing. Because of the fact that each arc is helped by the other arcs in the series the penetration of the wells is uniform throughout the entire surface of the slab resulting in a coating of uniform thickness and composition. The joining of the pools of the wells also helps to keep all of the arcs moving at the same speed against any tendency of one arc to slow down or run ahead of the remaining arcs. In this way there is no opportunity for the heat to run ahead of the arcs in the slab to any substantial extent so that after the arcs have moved about an inch or so along the slab the temperature of the slab in advance of the arcs is uniform throughout the remainder of the length of the slab. Thus the penetration of the arcs is uniform throughout the entire length of the slab as well as across its width, resulting in a high degree of uniformity of the thickness and composition of the coating.

The invention may also be carried out by using a single wide flat electrode as shown in Fig. 7. The slab 201 may be of low carbon steel and the electrode 202 of stainless steel. The electrode is insulated with respect to the slab except at the arc as indicated by arrows 203. The stainless steel electrode 202 is insulated with respect to the slab 201 by a layer 204 of prefused non-gas-forming material such as crushed finishing slag from an electric arc furnace. The electrode 202 is covered wtih a layer 205 of non-gas-forming material such as the material of layer 204. Since the layer 205 is above the molten pool of metal indicated at 206, gas evolved by materials in the layer 205 would move upwardly out of the layer and accordingly ordinary gravel of the size and type heretofore described may be used in the covering layer. The layer 205 being melted by the arc prevents contamination of the molten electrode metal by the atmosphere and at the same time prevents spattering of the molten electrode material.

The electrode metal 202 runs down by gravity into contact with the slab 201 and the molten slag formed by the insulating layer floats to the surface of the melted electrode metal. The melted electrode metal is chilled in place by the slab. Thereafter the slab may be turned over and a layer of electrode metal applied to the other side in the same manner.

The composite article resulting from the operations described in connection with Fig. 7 is thereafter rolled and trimmed as shown in Fig. 13. The rolling is carried out by conventional metal rolling equipment diagrammatically illustrated in rolls 207 and 208. The resultant rolled strip 209 is trimmed by cutters 210 and 211, respectively. I have found that the bond between the stainless steel and the low carbon steel effected by my invention is such that there is no separation produced by the rolling and that the resulting rolled strip is uniform and may be drawn or otherwise worked with greater facility than a solid stainless sheet of the same thickness.

In the embodiment of Figs. 8 to 11, inclusive, I have shown a framework having a longitudinal opening therethrough, through which a slab to be treated may be brought into the apparatus and removed from the apparatus. While the ends of the frame could be closed and the slab inserted and removed laterally, the structure shown lends itself better to straight line production methods. Mounted for vertical movement at the top of the frame longitudinally thereof is a series of carriers for the contactor bars which carry the cladding current to the electrodes. In the particular embodiment shown each carrier carries six contactors but this will be varied depending upon the number of electrodes. A lever mechanism is provided for each carrier so that as the arc approaches a set of contactors its carrier may be raised out of the way. Current, of course, is then brought to the electrodes through the remaining contactors, but it will be clear that there is always a set of contactors fairly close to the arc, whereby heating up of the electrodes beyond the arc is avoided. In this particular embodiment I have shown square electrodes as distinguished from the rod-like electrodes of the previously described embodiment, but of course rectangular or flat, broad electrodes may also be used.

At the top of the frame there are shown six bus bars which are connected to the three phases of a source of 3-phase current with the first and fourth bus bars connected to phase A, the second and fifth to phase B, and the third and sixth to phase C. (See Figure 15.)

As shown in Figs. 8 to 11 the apparatus according to this embodiment comprises a base structure indicated generally at 100 from which rises the supporting corner members 101 connected by the cross-beams 102. The base structure 100 is provided with leveling jacks 103 at its corners so that the slab support may be adjusted to any desired position. The slab is indicated at 104 resting upon a support 105. It may be clamped in position by the clamps indicated generally at 106. Such clamps may comprise a bolt 112 and nut 113 and the angle member 114 having the tongue 115. The base plate 100a of the support is slotted as at 116 and the bolts 112 pass through the slots 116 and the tongues 115 enter into said slots. The nuts 113 are of sufficient size that they will not pass through the slots. In some instances it will not be necessary to clamp the slab in position, and, as a matter of fact, in some cases bolting the slab down may tend to cause cracking. Therefore, the clamping means disclosed herein are for use in such cases where the clamping is found to be necessary or desirable.

Electrodes are indicated at 117 and in the particular embodiment shown, six such electrodes are placed side by side upon the slab and extending beyond the slab at one end as indicated at 117a.

For conducting the current to the electrodes, I employ a plurality of contactor bars which in this instance are grouped in groups of six. By reference to Figs. 8 and 11 it will be clear that because of the relatively close spacing between the electrodes the contactor bars are disposed in a staggered condition in two rows of three. It will be understood, however, that if broader electrodes were used the contactor bars could be arranged in a single row and three contactor bars would suffice.

The electrodes shown are square in cross-section and in actual practice I have used such electrodes which were ⅜" square. I have also used in practice broad electrodes which were ¾" thick and were 5½" wide. With such electrodes a single row arrangement of contactor bars is perfectly feasible.

Each group of electrodes is mounted in a carrier comprising an inverted generally U-shaped member 118 provided with a pivot bolt 119. Pivoted on the bolt 119 is the rod 120 and the lifting lever 121. Securely bolted to the end of the rod 120 is a weight 122.

A series of frame members, one for each carrier, are provided, each comprising the spaced upright members 123, 123a, which are connected across the top by the members 124. The members 124 are provided with the bearing brackets 125 through which the rods 120 pass and which serve to maintain them in vertical alignment.

Each of the levers 121 is pivoted as at 126 between a pair of the members 123, 123a and its opposite end 127 extends between an opposite pair of members 123, 123a. Upward movement on the handle end 127 of a lever 121 raises that carrier and its contactor bars, which will be described hereinafter. Since the point 119 has arcuate movement about the pivot point 126 the slot 128 in the member 118 is elongated to avoid binding. Any suitable latch 129 may be pivoted at 130 to the cross member 124 to engage under the lever to hold it in its raised position.

Figure 9:
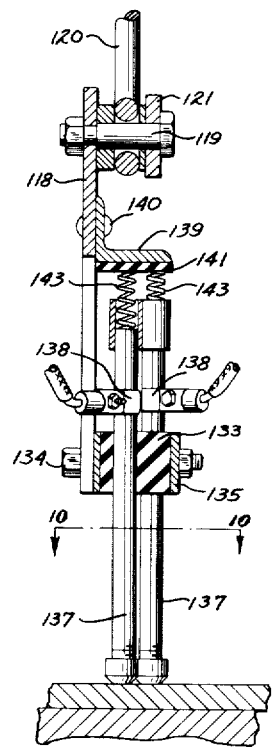
Fig. 9 is an elevation in section of a part of the apparatus used in the form of Fig. 8.
Figure 10:
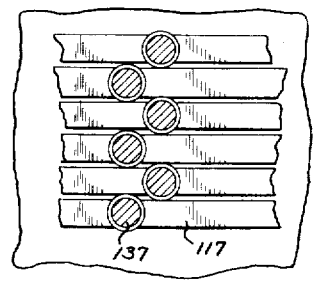
Fig. 10 is a plan view of a portion of the apparatus of Fig. 8 on larger scale to illustrate electrode and contact pin detail.

Coming now to a description of the mounting of the contactor bars themselves, a block of insulating material 133 is secured by means of bolts 134 to each of the members 118. Bars 135 also bolted to the blocks 133 extend laterally and enter between the respective members 123, 123a, on each side as indicated in broken lines at 136 in Fig. 11. The members 136 thus ride between the members 123, 123a, which serve as guides therefor. The contactor bars themselves indicated at 137 are carried in pairs in the blocks 133. The electric cables from the bus bars are connected to the contactor bars by means of the clamping collars 138 which prevent the contactor bars from falling out through the holes in the block 133. A bracket 139 is secured to the member 118 as by riveting or the like at 140, and carries an insulating pad 141. As best seen in Fig. 9, sleeves 142 are welded or otherwise suitably secured to the ends of the contactor bars to act as retainers for the compression springs 143. Thus when a carrier 118 is lowered onto the slab by disengaging the catch member 129, the weight 122 presses the C-shaped member downward and the force is transmitted through the bracket 139 and the springs 143 to the contactor bars, thus providing for the equalization of pressures, so that each individual contactor bar is brought into firm contact with its particular electrode. When a carrier is raised the springs 143 tend to force the contactor bars downwardly until the clamping collars 138 come to rest on the block 133.

Figure 11:
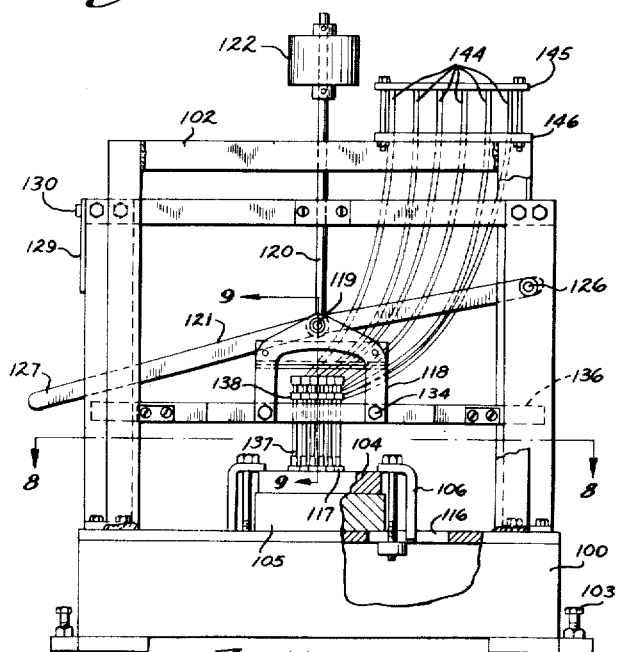
Fig. 11 is an elevation with parts in section of the form of apparatus shown in Fig. 8.

I have shown six bus bars in Fig. 11 indicated by the reference numerals 144. These are connected to the 3 phases A, B and C of a 3-phase source of power, and the bus bars are connected to the contactor bars, so that adjacent electrodes 117 are connected to different phases. For example, the first electrode on the left may be connected to phase A, the second to phase B, the third to phase C, the fourth to phase A, and so on. The bus bars are clamped between insulating plates 145, 146, which are supported upon the members 102.

Figure 8:
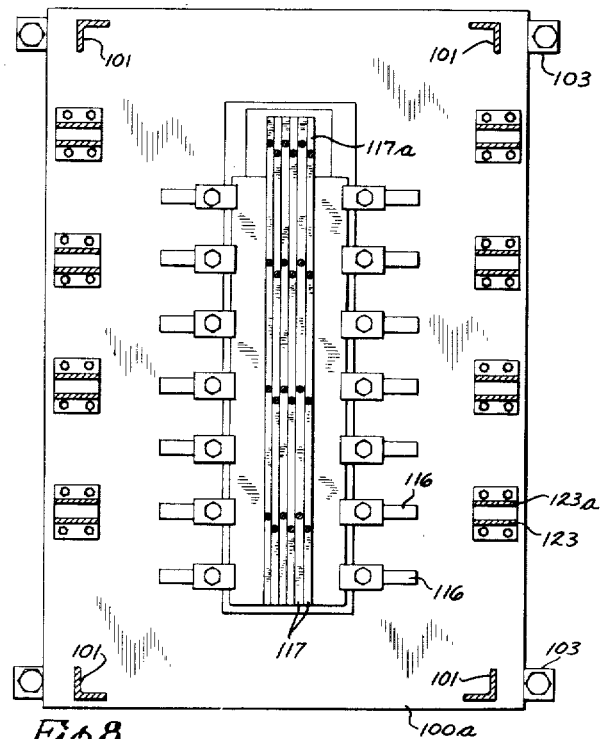
Fig. 8 is a plan view of a form of my invention utilizing a plurality of flat electrodes.

By reference to Fig. 8 it will be observed that one group of contactor bars contacts the electrodes beyond the end of the slab. This is in order to permit of cladding the slab all the way to its end while still having contact with the electrodes.

In practice the insulation is applied to the slab to be treated and the electrodes are then laid in place. The insulation preferably consists of a layer of granular flux such as crushed electric furnace finishing slag, or the like. The contactors are piled across the front end of each electrode for the purpose of starting the arc. The entire slab and the electrodes are then covered with granular flux which may be held in place by dams if desired. When the arcs are started by means of the steel filings, or millings, they travel along the length of the slab as the cladding operation proceeds, and each succeeding set of contactors is raised as the arcs approach within a few inches of them by operating the appropriate lever 127. This method of contacting has the same effect as the rolling contact method described above in that it prevents overheating of the cladding material and premature melting of the insulating flux by making it unnecessary for the heavy current to pass through more than a short length of cladding material to reach the arcs.

I have herein shown and particularly described certain embodiments of my invention and certain methods of operation embraced therein for the purpose of explaining its principle of operation and showing its application, but it will be obvious to those skilled in the art that many modifications and variations are possible and I am, therefore, to cover all such modifications and variations as fall within the scope of my invention which is defined in the appended claims.

What is claimed is:

1. A process of cladding a metallic slab with a bonded layer of another metal which comprises positioning elongated electrodes of said other metal in closely spaced parallelism flat upon the surface of a slab with the interposition of a thin layer of insulative substance between the assembled electrodes and the surface of the slab, the respective electrodes being insulated from each other, the effective mass of the electrodes overlying the slab being equal to the mass of said other metal desired to be deposited upon the slab in the area so overlayed, the mass of the slab in said area being substantially larger than the mass of said electrodes therein, connecting said slab and said electrodes respectively to sources of electric current of different potential so as to build up differences of potential between said slab and individual electrodes, starting electrical discharges between the slab and the individual electrodes at one end of the electrodes whereby to produce melting of the electrodes and surface portions of the slab in a line across one dimension of the slab, maintaining said line of discharges submerged in a covering blanket of slag, and adjusting the current for said individual discharges to produce a progressive end-to-end melting of said electrodes and the surface of said slab to produce in said line a continuous pool of molten metal containing melted portions of said electrodes and slab, and freezing said pool on said slab to form a coating of clad metal welded to said slab.

2. A process of cladding a metallic slab with a bonded layer of another metal which comprises the steps of providing a plurality of elongated electrodes of said other metal whose mass equals that desired for the deposit but is less than that of the portion of the slab to be clad, laying the elongated electrodes in closely spaced parallelism flat upon the slab with the electrodes insulated from each other and insulated from the slab by a thin layer of insulative substance, connecting said slab and said electrodes respectively to sources of electric current of different potential so as to build up differences of potential between said slab and individual electrodes, starting electrical discharges between the slab and the individual electrodes at one end of the electrodes whereby to produce melting of the electrodes and surface portions of the slab in a line across one dimension of the slab, and maintaining a supply of current to said assembled electrodes sufficient to cause a progressive end-to-end melting of said electrodes and a surface portion of the slab to produce a continuous pool of molten metal extending across the slab containing melted portions of said electrodes and slab and freezing said pool on said slab to form a coating of clad metal welded to said slab.

3. A process of cladding a metallic slab with a bonded layer of another metal which comprises the steps of providing a plurality of elongated electrodes of said other metal in multiples of three whose aggregate mass equals that desired for the deposit but is less than that of the portion of the slab to be clad, laying the elongated electrodes in closely spaced parallelism flat upon the slab with the electrodes insulated from the slab by a thin layer of insulative substance and with the electrodes insulated from each other, connecting said slab and each group of three electrodes respectively to terminals of different potential of a source of three-phase electric current so as to successively build up differences of potential between said slab and individual electrodes, starting electrical discharges between the slab and the individual electrodes at one end of the electrodes whereby to produce melting of the electrodes and surface portions of the slab in a line across one dimension of the slab, and maintaining a supply of current to said assembled electrodes sufficient to cause a progressive end-to-end melting of said electrodes and a surface portion of the slab to produce a continuous pool of molten metal extending across the slab with the pool containing co-mingled melted portions of said electrodes and slab, and freezing said pool on said slab.

4. A process of cladding a metallic slab with a bonded layer of another metal which comprises the steps of providing a plurality of elongated electrodes of said other metal in multiples of three whose aggregate mass equals that desired for the deposit but is less than that of the portion of the slab to be clad, laying the elongated electrodes in closely spaced parallelism flat upon the slab with the electrodes insulated from the slab by a thin layer of insulative substance and with the electrodes insulated from each other, connecting said slab and each group of three electrodes respectively to terminals of different potential of a source of three-phase electric current so as to successively build up differences of potential between said slab and individual electrodes, starting electrical discharges between the slab and the individual electrodes at one end of the assembly whereby to produce melting of the electrodes and surface portions of the slab in a line across one dimension of the slab, maintaining said line of discharges submerged in a covering blanket of slag, and maintaining a supply of current to said assembled electrodes sufficient to cause a progressive end-to-end melting of said electrodes and a surface portion of the slab to produce a continuous pool of molten metal extending across the slab with the pool containing co-mingled melted portions of said electrodes and slab, and freezing the pool on said slab.

5. A process of cladding a metallic slab with a bonded layer of another metal which comprises the steps of providing a plurality of elongated electrodes of said other metal in multiples of three whose aggregate mass equals that desired for the deposit but is less than that of the portion of the slab to be clad, laying the elongated electrodes in closely spaced parallelism flat upon the slab with the electrodes insulated from the slab by a thin layer of insulative substance and with the electrodes insulated from each other, connecting said slab and each group of three electrodes respectively to the terminals of different potential of a source of three-phase electric current so as to successively build up differences of potential between said slab and individual electrodes, starting electrical discharges between the slab and the individual electrodes at one end of the assembly whereby to produce melting of the electrodes and surface portions of the slab in a line across one dimension of the slab, maintaining a supply of current to said assembled electrodes sufficient to cause a progressive end-to-end melting of said electrodes and a surface portion of the slab to produce a continuous pool of molten metal extending across the slab with the pool containing co-mingled melted portions of said electrodes and slab, and adjusting the current for said individual electrodes to maintain the lateral alignment of said electrical discharges during the progressive melting thereof, and freezing said pool on said slab.

6. A process of cladding a metallic slab with a bonded layer of another metal which comprises the steps of providing a plurality of elongated electrodes of said other metal whose mass equals that desired for the deposit but is less than that of the portion of the slab to be clad, laying the elongated electrodes in closely spaced parallelism flat upon the slab with the electrodes insulated from each other and insulated from the slab by a thin layer of insulative substance, covering said electrodes with a blanket of slag forming material, connecting said slab and said electrodes respectively to sources of electric current of different potential so as to build up differences of potential between said slab and individual electrodes, starting electrical discharges between the slab and the individual electrodes at one end of the electrodes whereby to produce melting of the electrodes and surface portions of the slab in a line across one dimension of the slab, and maintaining a supply of current to said assembled electrodes sufficient to cause a progressive end-to-end melting of said electrodes and a surface portion of the slab to produce a continuous pool of molten metal extending across the slab containing melted portions of said electrodes and slab, and freezing said pool on said slab to form a coating welded to said slab.

7. A process of cladding a metallic slab with a bonded layer of another metal which comprises positioning elongated electrodes of said other metal in closely spaced parallelism flat upon a surface of a slab with the inter-position of a thin layer of insulative substance between the assembled electrodes and the surface of the slab, the respective electrodes being insulated from each other, the effective mass of the electrodes overlying the slab being equal to the mass of said other metal desired to be deposited upon the slab in the area so overlaid, the mass of the slab in said area being substantially larger than the mass of said electrodes therein, connecting said slab and intermediate points of said electrodes respectively to sources of electric current of different potential so as to build up differences of potential between said slab and individual electrodes, starting electrical discharges between the slab and the individual electrodes at one end of the electrodes whereby to produce melting of the electrodes and surface portions of the slab in a line across one dimension of the slab, maintaining said line of discharges submerged in a covering blanket of slag, progressively advancing the points of application of current to said electrodes to produce a progressive end-to-end melting of said electrodes and the surface of said slab and to produce in said line a continuous pool of molten metal containing melted portions of said electrodes and slab, and freezing said pool on said slab to form a coating welded to said slab.

8. A process of cladding a metallic slab with a bonded layer of another metal which comprises the steps of providing a plurality of elongated electrodes of said other metal whose mass equals that desired for the deposit but is less than that of the portion of the slab to be clad, laying the elongated electrodes in closely spaced parallelism flat upon the slab with the electrodes insulated from each other and insulated from the slab by a thin layer of insulative substance, covering said electrodes with a blanket of slag forming material, connecting said slab and intermediate points of said electrodes respectively to sources of electric current of different potential so as to build up differences of potential between said slabs and individual electrodes, starting electrical discharges between the slab and the individual electrodes at one end of the electrodes whereby to produce melting of the electrodes and surface portions of the slab in a line across one dimension of the slab, and progressively advancing the points of application of current to said electrodes to cause a progressive end-to-end melting of said electrodes and a surface portion the slab to produce a continuous pool of molten metal extending across the slab containing melted portions of said electrodes and slab, and freezing said pool on said slab to form a coating of clad metal welded to said slab.

9. A process of making clad metal comprising laying electrode metal over a substantially flat imperforate surface of a slab of base metal, with the electrode metal insulated from and substantially parallel to said surface, supplying welding current to the electrode metal and to the slab, forming an electric arc between the base metal and the full depth and width of the electrode metal at a point spaced from the point of application of current to the electrode metal lengthwise along the electrode metal in a direction parallel to said surface of the base metal, melting the electrode metal through its full width and depth, depositing the melted metal on the slab, progressing the arc lengthwise along the electrode metal toward the point of application of welding current to the electrode metal to deposit the electrode metal along the surface of the base metal at the same rate that the electrode metal is consumed, freezing the electrode metal on the surface of the base metal thereby forming a coating on the surface of the base metal which includes the electrode metal and which has a surface parallel to said surface of the base metal, and thereafter rolling said surface of the coating to produce a strip having a surface formed by the metal of the coating.

10. The process of making clad metal comprising laying electrode metal on a substantially flat imperforate surface of a slab of base metal, with the electrode metal insulated from and substantially parallel to said surface, supplying welding current thereto, forming an electric arc between the base metal and the full depth and width of the electrode metal at a point spaced from the point of application of current to the electrode metal lengthwise along the electrode metal in a direction parallel to said surface of the base metal, melting the electrode metal through its full width and depth, depositing the melted metal on the slab, progressing the arc lengthwise along the electrode metal toward the point of application of welding current to the electrode metal, melting a portion of the surface of the base metal and depositing the electrode metal progressively in a molten pool including the electrode metal and the melted base metal, the volume of electrode metal initially laid upon the slab exceeding the volume of base metal melted during deposition of such electrode metal, and freezing said molten pool on the surface of the slab thereby forming a coating on the slab at the same rate as the rate of arc progression along the slab, and thereafter rolling the slab to produce a strip having a surface formed by the metal of the coating.

11. The process of making clad metal comprising laying electrode metal on a substantially flat imperforate surface of a slab of base metal, with the electrode metal insulated from and substantially parallel to said surface, supplying welding current thereto, forming an electric arc between the base metal and the full depth and width of the electrode metal at a point spaced from the point of application of current to the electrode metal lengthwise along the electrode metal in a direction parallel to said surface of the base metal, melting the electrode metal through its full width and depth, depositing the melted metal on the slab, progressing the arc lengthwise along the electrode metal toward the point of application of welding current to the electrode metal, melting a portion of the surface of the base metal and depositing the electrode metal progressively in a molten pool including the electrode metal and the melted base metal, the volume of electrode metal initially laid upon the slab being not less than twice the volume of base metal melted during deposition of such electrode metal, and freezing said molten pool on the surface of the slab thereby forming a coating on the slab at the same rate as the rate of arc progression along the slab, and thereafter rolling the slab to produce a strip having a surface formed by the metal of the coating.

12. A process of making clad metal comprising laying electrode metal over a substantially flat imperforate surface of a metal slab, with the electrode metal insulated from and substantially parallel to said surface, the volume of the electrode metal being less than the volume of the underlying slab, placing a layer of granular slag-forming material over the electrode metal, supplying welding current thereto, forming an electric arc between the base metal and the full depth and width of the electrode metal at a point spaced from the point of application of current to the electrode metal lengthwise along the electrode metal in a direction parallel to said surface of the base metal to produce a single molten pool supported by the underlying slab and including electrode metal and metal melted from the surface of the slab, and maintaining a supply of welding current sufficient to cause arc progression and progression of the molten pool along the underlying slab and under the slag-forming material, freezing the molten pool on the slab and under the slag forming material so as to form on said slab a surface coating containing the electrode metal at the same rate as the rate of arc progression along the electrode metal removing the slag-forming material and thereafter rolling the coated slab to produce a strip having a surface formed by the metal of the coating.

13. A process of cladding a unitary slab of metal comprising arranging electrode metal substantially parallel to a substantially horizontal, imperforate surface of said slab and over an area thereof having a length exceeding the thickness of said electrode metal, the quotient of said area divided by the length thereof exceeding the thickness of said electrode metal, with said electrode metal spaced from said surface by a thin layer of insulating material, supplying welding current to said electrode metal and to said slab, starting an electrical discharge between said slab and said electrode metal through the full thickness of said electrode metal and across the full width of said area at a point spaced lengthwise along said area from the point of application of welding current to said electrode metal, continuing the supply of current, melting the full thickness of said electrode metal across the full width of said area and progressively through the full length thereof, melting a portion only of the thickness of said slab forming a molten pool composed of said electrode metal and metal from said slab, supporting said molten pool in contact with the surface of the remaining thickness of said slab, and freezing said pool while so supported to form a coating of clad metal welded to said slab throughout the width and length of said area.

14. A process of cladding a unitary slab of metal comprising arranging electrode metal substantially parallel to a substantially horizontal, imperforate surface of said slab and over an area thereof having a length exceeding the thickness of said electrode metal, the quotient of said area divided by the length thereof exceeding the thickness of said electrode metal, with said electrode metal spaced from said surface by a thin layer of insulating material, covering said electrode metal with a blanket of slag forming material, suplying welding current to said electrode metal and to said slab, starting an electrical discharge between said slab and said electrode metal through the full thickness of said electrode metal and across the full width of said area at a point spaced lengthwise along said area from the point of application of welding current to said electrode metal, continuing the supply of current melting the full thickness of said electrode metal across the full length thereof, melting a portion only of the thickness of said slab forming a molten pool composed of said electrode metal and metal from said slab, supporting said molten pool in contact with the surface of the remaining thickness of said slab, and freezing said pool while so supported to form a coating of clad metal welded to said slab throughout the width and length of said area.

15. A process of cladding a unitary slab of metal comprising arranging electrode metal substantially parallel to a substantially horizontal, imperforate surface of said slab and over an area thereof having a length exceeding the thickness of said electrode metal, the quotient of said area divided by the length thereof exceeding the thickness of said electrode metal, with said electrode metal spaced from said surface by a thin layer of insulating material, supplying welding current to an intermediate part of said electrode metal and to said slab, starting an electrical discharge between said slab and said electrode metal through the full thickness of said electrode metal and across the full width of said area at a point spaced lengthwise along said area from the point of application of welding current to said electrode metal, progessively advancing the point of application of welding current along the length of said electrode metal, continuing the supply of current, melting the full thickness of said electrode metal across the full width of said area and progressively through the full length thereof, melting a portion only of the thickness of said slab forming a molten pool composed of said electrode metal and metal from said slab, supporting said molten pool in contact with the surface of the remaining thickness of said slab, and freezing said pool while so supported to form a coating of clad metal welded to said slab throughout the width and length of said area.

16. A process of cladding a unitary slab of metal comprising arranging electrode metal substantially parallel to a substantially horizontal, imperforate surface of said slab and over an area thereof having a length exceeding the thickness of said electrode metal, the quotient of said area divided by the length thereof exceeding the thickness of said electrode metal, with said electrode metal spaced from said surface by a thin layer of insulating material, supplying welding current to said electrode metal and to said slab, starting an electrical discharge between said slab and said electrode metal through the full thickness of said electrode metal and across the full width of said area at a point spaced lengthwise along said area from the point of application of welding current to said electrode metal, surrounding the electrical discharge with slag forming material in particles large enough to permit the escape of gases and small enough to be fused by the heat of the electrical discharge, at least one of said materials containing ionization ingredients, continuing the supply of current, melting the full thickness of said electrode metal across the full width of said area and progressively through the full length thereof, melting a portion only of the thickness of said slab forming a molten pool composed of said electrode metal and metal from said slab, supporting said molten pool in contact with the surface of the remaining thickness of said slab, and freezing said pool while so supported to form a coating of clad metal welded to said slab throughout the width and length of said area.

17. The process of making composite metal comprising laying a plurality of elongated electrodes over the surface of a slab of metal to be coated, the electrodes being of a relatively small volume with respect to the volume of the slab to be coated and being arranged side-by-side parallel to each other and parallel to the slab and spaced from each other and from the slab, supplying welding current to said electrodes, progressing arcs simultaneously along the length thereof, and fusing together the surface of the slab and the metal of the electrodes.

18. The process of cladding a metallic slab with a bonded layer of another metal, comprising supporting a slab with a substantially flat, rectangular surface thereof arranged substantially horizontal, laying over said surface a sheet of electrode metal having a length and breadth substantially equal to the length and breadth of said surface and having a thickness substantially less than its length or breadth and less than the thickness of said slab, with said sheet of electrode metal insulated from and substantially parallel to said surface, supplying welding current to said sheet and to said slab, forming an electric arc between said slab and the full thickness and breadth of said sheet along a line across the width of said sheet and spaced lengthwise of said sheet from the point of application of current thereto, melting the sheet through its full width and depth, depositing the melted metal on the slab progressing the arc lengthwise along the sheet and freezing the electrode metal on the surface of the slab.

19. The process of making composite metal comprising laying a plurality of elongated electrodes over the surface of a slab of metal to be coated, each of said electrodes having a width exceeding its thickness and a length exceeding its width, the electrodes being of a relatively small volume with respect to the volume of the slab to be coated and being arranged side-by-side parallel to each other and parallel to the slab and spaced from each other and from the slab, supplying welding current to said electrodes, progressing arcs simultaneously along the length thereof, and fusing together the surface of the slab and the metal of the electrodes.

20. A process of cladding a metallic slab with a bonded layer of another metal which comprises supporting the slab with its side surface to be clad arranged substantially in a horizontal plane, laying a thin layer of insulative substance over the said side surface of the slab, supporting a layer of electrode metal on the layer of insulative material above the said side surface of the slab, the layer of electrode metal being thin relative to the thickness of the slab and having a width and length substantially exceeding its thickness, supplying welding current to the layer of electrode metal and to the slab, forming an electric arc between the slab and the full width and thickness of the layer of electrode metal at a point spaced from the point of application of current to the electrode metal lengthwise along the electrode metal, melting the layer of electrode metal through its full width and length, depositing the melted metal on the slab in a continuous pool extending across the width of the layer of electrode metal, progressing the arc lengthwise along the layer of the electrode metal toward the point of application of welding current, and freezing the molten pool on the said side surface of the slab to form a bonded layer of metal thereon.

ROBERT E. KINKEAD.

References Cited in the file of this patent
UNITED STATES PATENTS

| Number | Name | Date |
|---|---|---|
| 2,220,576 | Mackusick | Nov. 5, 1940 |
| 2,402,165 | Kinkead | June 18, 1946 |

Certificate of Correction

Patent No. 2,653,212 September 22, 1953

ROBERT E. KINKEAD

It is hereby certified that error appears in the printed specification of the above numbered patent requiring correction as follows:

Column 16, line 44, after "portion" insert *of*; column 20, line 57, for "length" read *depth*;

and that the said Letters Patent should be read as corrected above, so that the same may conform to the record of the case in the Patent Office.

Signed and sealed this 3rd day of November, A. D. 1953.

[SEAL]

ARTHUR W. CROCKER,
*Assistant Commissioner of Patents.*